United States Patent
Couse

[19]

[11] Patent Number: 6,006,088
[45] Date of Patent: Dec. 21, 1999

[54] INTELLIGENT CORDLESS TELEPHONE INTERFACE DEVICE

[75] Inventor: Peter Couse, Ottawa, Canada

[73] Assignee: Mitel Corporation, Kanata, Canada

[21] Appl. No.: 08/890,801

[22] Filed: Jul. 11, 1997

[30] Foreign Application Priority Data

Jul. 11, 1996 [CA] Canada .................................. 2180991

[51] Int. Cl.⁶ ................................................ H04M 11/00
[52] U.S. Cl. ........................................ 455/415; 455/414
[58] Field of Search .................................... 455/415, 414, 455/465; 379/120, 142, 264, 61, 67

[56] References Cited

U.S. PATENT DOCUMENTS

| | | | |
|---|---|---|---|
| 5,274,699 | 12/1993 | Ranz | 379/142 |
| 5,526,406 | 6/1996 | Luneau | 379/61 |
| 5,530,745 | 6/1996 | Urasaka et al. | 379/355 |
| 5,559,860 | 9/1996 | Mizikovsky | 379/58 |
| 5,572,576 | 11/1996 | Klausner et al. | 379/67 |

FOREIGN PATENT DOCUMENTS 2268663  12/1994  United Kingdom .

*Primary Examiner*—Wellington Chin
*Assistant Examiner*—Pablo N. Tran
*Attorney, Agent, or Firm*—Marks & Clerk

[57] ABSTRACT

An intelligent cordless telephone interface device for connection to a telephone line is means responsive to an incoming call on the telephone line to determine the identity of the caller. The device communicates with a cordless telephone to convey the identity of the caller to the user and is responsive to input from the user via the cordless telephone to handle the incoming call in the desired manner, for example to direct it to an answering machine, send an announcement to the caller or the like.

9 Claims, 2 Drawing Sheets

PC/Cordless Phone/Telephone Network Integration Device Example

PC/Cordless Phone/Telephone Network Integration Device Example

INTELLIGENT CORDLESS TELEPHONE INTERFACE DEVICE

BACKGROUND OF THE INVENTION

This invention relates generally to the field of telephony, and more particularly to an intelligent cordless telephone interface device.

The telephone can be and often is very disruptive to ones life. The dilemma is voice communication remains the single most important form of communication to most people and as a result we are naturally inclined to want to answer the phone when it rings even though it can be very disruptive at times. Many people are taking crude steps today at managing this disruption. There are those who use today's answering machines as call screeners by listening to the message as it is being left and then picking up the phone if it is someone they wish to talk to. Others try to control the disruption by implementing rules like "no-one answers the phone during dinner".

There are plug-in cards and add on devices on the market today that allow a PC Application to read caller-ID information off a phone line. However, all of these solutions require the user to be in front of the PC to benefit from the caller-ID information. The reality of the home environment is that people do not spend all of their time in front of their PC. This is true even for an individual who's business is based in the home.

Cordless phones have greatly increased accessibility within the home or office environment. The ability to answer the phone from anywhere in and around the house has made cordless phones very successful products. With the increased accessibility provided by this technology comes the realization that 'increased access' means increased access from both desirable and undesirable sources. A deficiency of existing 'cordless communications' solutions is that incoming call management is very limited. For the majority of cordless phones in use today, the user has no way of knowing who the calling party is and therefore has no way of deciding how to handle the call.

Cordless phones are known that display calling line ID, but choices for handling the call are limited to answer or don't answer (in which case an answering machine could be used to answer the call).

An object of the invention is to overcome these deficiencies of the prior art.

SUMMARY OF THE INVENTION

According to the present invention there is provided an intelligent cordless telephone interface device for connection to a telephone line, comprising means responsive to an incoming call on said telephone line to determine the identity of the caller; means for communicating with a cordless telephone to convey the identity of the caller to the user; means responsive to input from the user via said cordless telephone to handle the incoming call in the desired manner.

The telephone line can be any line carrying communications signals. For example, it can be a regular telephone line connected to the PSTN via the central office, or alternatively, it can a line connected to an intercom forming part of a entry system, or even a line connected to a home security system.

This solution serves to minimize the disruption caused by the telephone by placing a whole new level of control in the users'hands. It allows them to be "masters" of the phone rather than them being "mastered by the phone". This solution addresses the true nature of the home environment, i.e. people want to be accessible while mobile within the home and provides a solution that gives the user a means for managing that accessibility. This solution also capitalizes on the existing install base of cordless phones already in the marketplace and allows users to build upon the investment they have made in that phone.

For example, the user may instruct the device to direct the call to an answering machine, send a recorded announcement to the caller etc.

The device can thus provide a connection to a phone line plus an interface for connecting a cordless phone base station (any typical cordless phone found in the home today can be used). This device preferably connects to a personal computer (PC) using any suitable connector, such as an RS232, parallel port, or Universal Serial Bus (USB). The device can utilize the PC to provide intelligence in handling phone calls through a Software Application running on the PC. However, connection to a PC as the call handling interface could be self-contained within the interface device.

In the case where there is a PC connection, the application can provide a 'connect to cordless phone' function in conjunction with the interface device that utilizes caller-ID or basic Integrated Voice Response (IVR) functionality to determine a caller's identity. On an incoming call, the PC identifies who is calling and then calls the user's cordless phone through the interface device and announces to the user who is calling using speech synthesis or by replaying a recording of the user leaving their name. The user can then instruct the PC on how they want the call handled utilizing speech recognition or DTMF keys on the cordless phone.

A number of programmable options are available, such as 'Answer the Call' or 'Tell the caller to wait a minute until I'm free' or 'Transfer the call to one of my voice mail-boxes' etc. If the user chooses to answer the call, the PC would instruct the interface device to 'conference' or connect the phone line with the cordless phone line thus allowing the user to talk to the calling party. The conferencing function can be provided within the device or be done by the PC itself as both voice channels could be directed to/from the device to the PC.

The 'connect to cordless phone' function could be enabled or disabled directly from the PC or from the cordless phone or from the device itself. If this device were built into a phone, for example, there could be a button on the phone that enabled & disabled the function. The 'connect to cordless phone' function can be set up on a screened basis as well, i.e. the user can set up a particular persons phone number (or list of numbers) that they want transferred to their cordless phone while all others would be answered by their PC based answering machine (voice-mail) software or by a standalone answering machine connected to the interface device.

BRIEF DESCRIPTION OF THE DRAWINGS

The invention will now be described in more detail, by way of example, only with reference to the accompanying drawings, in which.

DESCRIPTION OF THE PREFERRED EMBODIMENTS

Figure 1:
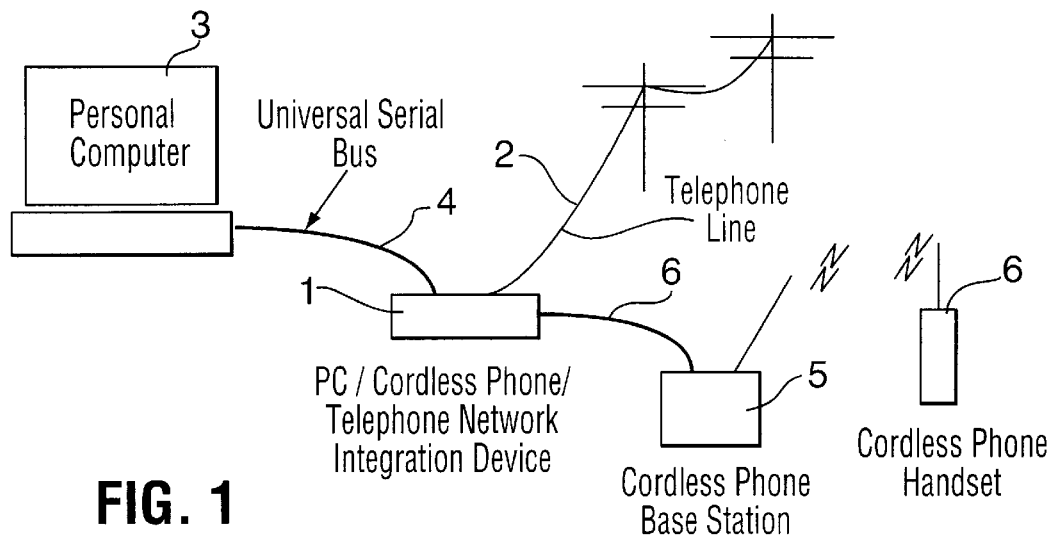
FIG. 1 is a high level block diagram of one embodiment of the invention.

Referring to FIG. 1, an interface device 1 is connected to a wireline 2 forming part of the public switched telephone network (PSTN). The device 1 is connected to a personal computer 3 over a universal serial bus 4 or like connection and a cordless telephone base station 5 over a line 6. The base station 5 can establish two-way wireless communication with the cordless handset 6 is a known manner.

Figure 2:
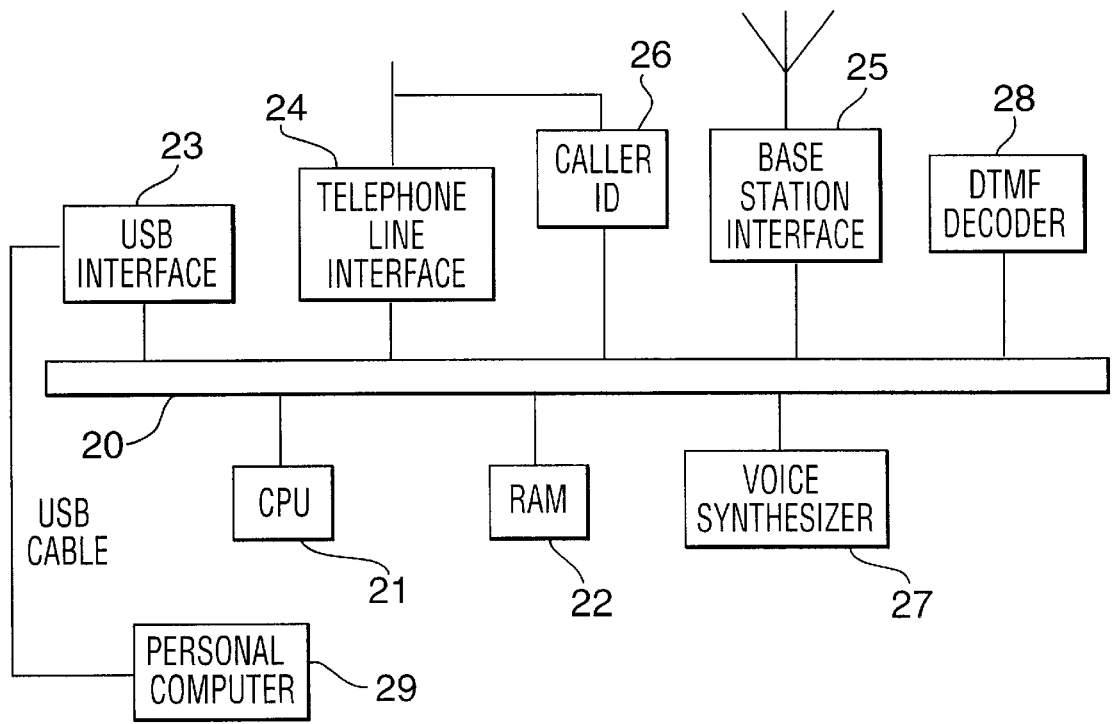
FIG. 2 is a block diagram of the interface device.

As shown in FIG. 2, the interface device comprises a main bus 20, a CPU Central Processing Unit 21, a RAM 22, a USB interface 23, a telephone line interface 24, and a base station interface 25. A caller ID unit 26 extracts the ID of the caller from the FSK caller ID signal embedded between the incoming ringing signals.

The user pre-configures the device by means of applications software in the PC 3, which communicates with CPU 21 over USB 4. For example, the user can set up the application to store instructions to reject certain callers or pass them directly to an answering machine.

Figure 3:
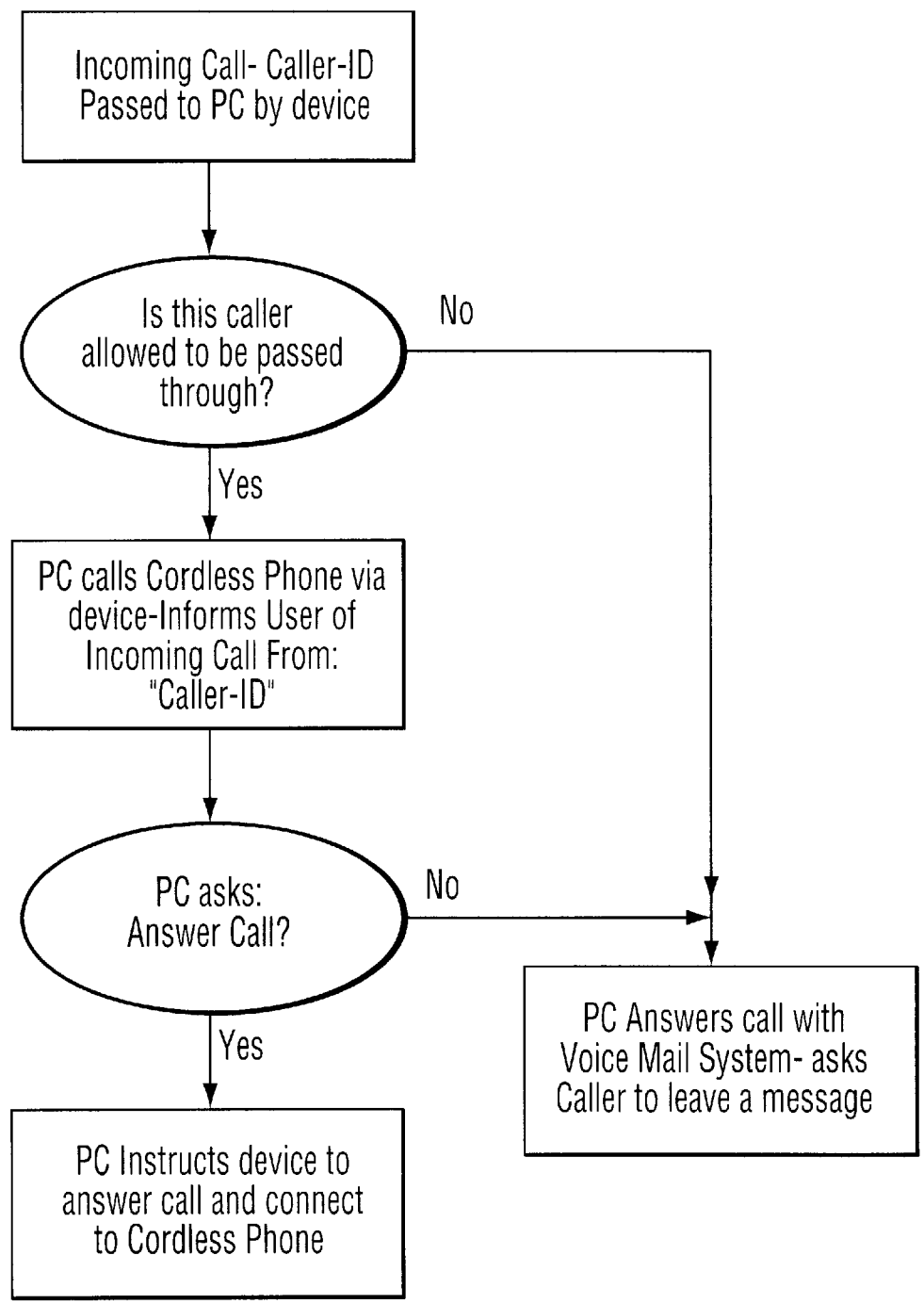
FIG. 3 is a flow chart showing one implementation of the invention.

FIG. 3 shows one possible scenario. Upon receipt of an incoming call, the caller ID is first determined by unit 26 and passed to the PC 3, which then determines whether this caller is allowed to be passed through. If yes, the device calls the phone 6 and advises the user of the identity of the caller using the voice synthesizer 27. The device asks the user if he or she wishes to answer the call. The user then presses a key to send a DTMF response, which is decoded by DTMF decoder unit 28. The user can, for example, instruct the device to answer the call and connect to the cordless phone 6 or direct the call to a voice mail application running on the PC 29, which will ask the caller to leave a message.

In alternative embodiment, the DTMF decoder 28 can be replaced by a voice recognition unit which responds to voice commands from the user.

Having an interface that can connect a cordless phone to a PC enables a number of other very useful functions. For example, a user can initiate a call on the cordless phone which would connect him to the computer from the device over the PC connection. The user could then give spoken or DTMF commands to the PC to perform a number of functions like "call Bob Smith" (the PC would look up Bob Smith's number within a directory on the PC and dial the number while 'connecting' the phone line with the cordless line). The user could say "take a note" and have the PC record a spoken note that could be attached to a particular person's directory entry or say "set a reminder for 3:00PM today" and have the PC record a spoken reminder. At 2:55PM the PC would call the user on the cordless phone and play back the reminder.

Other PC-connected devices can capitalize on the presence of this device. For example, a wireless front door intercom could be connected into the interface device or the PC. When someone pushed the intercom button, the PC would recognize that someone was at the front door and call the owner of the house on his cordless phone. The PC would ask the caller to identify themselves and then record this identification. The PC would then playback the identification over the cordless phone and ask whether he would like to talk to the caller or not. If the owner responded 'yes' to this question then the PC would connect the front door intercom to the cordless phone through the interface device and enabling the owner to talk to "Joe Blow" at the door. The owner could have a number of additional options available for how he would like to handle the caller i.e. play a recorded message with the option of letting the caller leave a message for the owner (the owner would have the option of listening to the caller while he left the message in case, while hearing what was said, he decided to cut in and talk to him).

Another device that could be packaged together with this cordless interface device is a PC based 'self-monitoring' home security system. A security system interface could be connected to the PC which in turn interfaces with a number of security detectors/monitoring devices (these could link to the PC using wireless technology). When one of these security detectors was tripped, the PC would detect it and immediately call an emergency number, such as 911, through the interface device. At the same time the system would call the owner of the house on his cordless phone through the interface device and announce that the security system has been breached and then connect him to the 911 call. Fire monitoring could be added to the system with detectors being placed in every room (these could also link to the PC using wireless technology). When one of the detectors tripped, the PC would again, using the interface device, call 911 while calling the owner at the same time. The PC could tell the owner which room of the house the tripped detector before and connecting him through to the 911 call.

The device could also interface to a cellular phone through a second PSTN phone line. In one embodiment, the device can transfer an incoming call selectively to the cellular or cordless phone as set-up by the owner.

The same programmable options would be available on the cellular phone, such as 'Answer the Call' or 'Tell the caller to wait a minute until I'm free' or 'Transfer the call to one of my voice mail-boxes' etc. Today the WAH (Work-at-Home) worker would likely turn on an answering machine on their business line to handle after hours business related calls. With this solution the user could enable the call screen feature after hours to transfer a call from a specific customer (the one very important call they don't want to miss no matter what time it is) to their cordless or cellular phone while all others would go to voice mail.

Often a home office household has two phone lines because they want one for personal use and one for business use. With this solution, the user can answer calls coming in on both lines with their cordless phone being informed by the PC which line the call is coming in on prior to answering the call.

The invention involves a tangible return on investment when addressing the cellular user. Currently, there is a tremendous upheaveal in the cellular marketplace as users come to the realization that the value provided does not justify the cost of service. Cellular usage could be effectively managed with the proposed solution thus greatly reducing the cost of using the cellular service bringing it more in line with the value provided. The user would not have to give out their cellular phone number to anyone, but would instead utilize the PC to manage access to their cellular phone line.

For the home office worker, the return on investment realized with the 'transfer to cordless' solution comes primarily from saving time time wasted on phone conversations that do not contribute to the success of the business. Being able to manage access to the cordless phone allows the mobile user the ability to more effectively manage their time by being able to select the calls they want to spend their time on. Being able to know who is calling when away from the PC as well as when in front of it provides a secondary benefit of being able to present a professional image to customers at all timesbecause knowing who is calling allows for much more personalized service.

I claim:

1. Intelligent cordless telephone apparatus for connection to a telephone line, comprising:

a) a base station;

b) a cordless telephone capable of establishing two-way wireless communication with said base station;

c) an interface device for connection to a wireline network to receive and process incoming telephone calls and capable of making outgoing calls, said interface device being connected to said base station for establishing communication with said cordless telephone, and said interface device comprising a central processing unit; a caller ID device responsive to a caller id signal associated with incoming call on said wireline to determine the identity of the caller; means for communicating with said cordless telephone to convey the identity of the caller to the user of the cordless telephone; and a decoder for decoding commands entered by said user via said cordless telephone; and d) a personal computer communicating with said central processing unit for controlling the operation of said interface device, said personal computer running applications software configurable to direct said interface device to process incoming calls in accordance with instructions stored in said personal computer, and said personal computer further being responsive to said commands entered by said user via said cordless telephone to direct said interface device to process and establish calls in accordance with said commands.

2. Intelligent cordless telephone apparatus as claimed in claim 1, wherein said caller ID device extracts the caller's ID from the ID signal inserted between the ringing signals.

3. Intelligent cordless telephone apparatus as claimed in claim 1, wherein said decoder comprises a DTMF decoder.

4. Intelligent cordless telephone interface device as claimed in claim 1, wherein said decoder comprises a voice recognition device.

5. Intelligent cordless telephone interface device as claimed in claim 1, further comprising a voice synthesizer for generating voice messages for transmission to the cordless phone to convey the identity of the caller.

6. Intelligent cordless telephone apparatus as claimed in claim 1, wherein said interface device is connected to said personal computer over a Universal Serial Bus.

7. Intelligent cordless telephone apparatus as claimed in claim 1, wherein said telephone line is connected to a door entry intercom.

8. Intelligent cordless telephone apparatus as claimed in claim 1, further comprising a voice mail unit, and wherein said device is selectively responsive to said commands from the user to direct an incoming call to the voice mail unit.

9. Intelligent cordless telephone apparatus as claimed in claim 1, wherein said telephone line is connected to a home security system.

* * * * *